United States Patent [19]
Avicola

[11] 3,984,631
[45] Oct. 5, 1976

[54] AUTOMATIC PEAKING CONTROL CIRCUIT FOR LOW LEVEL T.V. SIGNAL RECEPTION

[75] Inventor: Richard Avicola, Addison, Ill.

[73] Assignee: Warwick Electronics Inc., Chicago, Ill.

[22] Filed: Feb. 24, 1975

[21] Appl. No.: 552,545

[52] U.S. Cl. .............................................. 178/7.3 R
[51] Int. Cl.² .......................................... H04N 5/48
[58] Field of Search ................. 178/7.3 R, DIG. 19, 178/DIG. 12; 358/38, 36; 325/400, 408

[56] References Cited
UNITED STATES PATENTS

| | | | |
|---|---|---|---|
| 2,627,022 | 1/1953 | Anderson | 178/7.3 R X |
| 3,352,969 | 11/1967 | Konings | 178/7.3 R X |
| 3,461,233 | 8/1969 | Kent et al. | 178/7.3 R |
| 3,472,954 | 10/1969 | Willis | 178/7.3 R |
| 3,577,152 | 5/1971 | Yahagi | 358/38 X |
| 3,919,714 | 11/1975 | Bingham | 358/38 |

*Primary Examiner*—Robert L. Griffin
*Assistant Examiner*—Mitchell Saffian
*Attorney, Agent, or Firm*—Wegner, Stellman, McCord, Wiles & Wood

[57] ABSTRACT

In a television receiver, an automatic peaking control circuit is responsive to an automatic gain control signal to lower the peak frequency response of the video amplifier when the received television signal is so weak that much of its high frequency content is noise.

9 Claims, 2 Drawing Figures

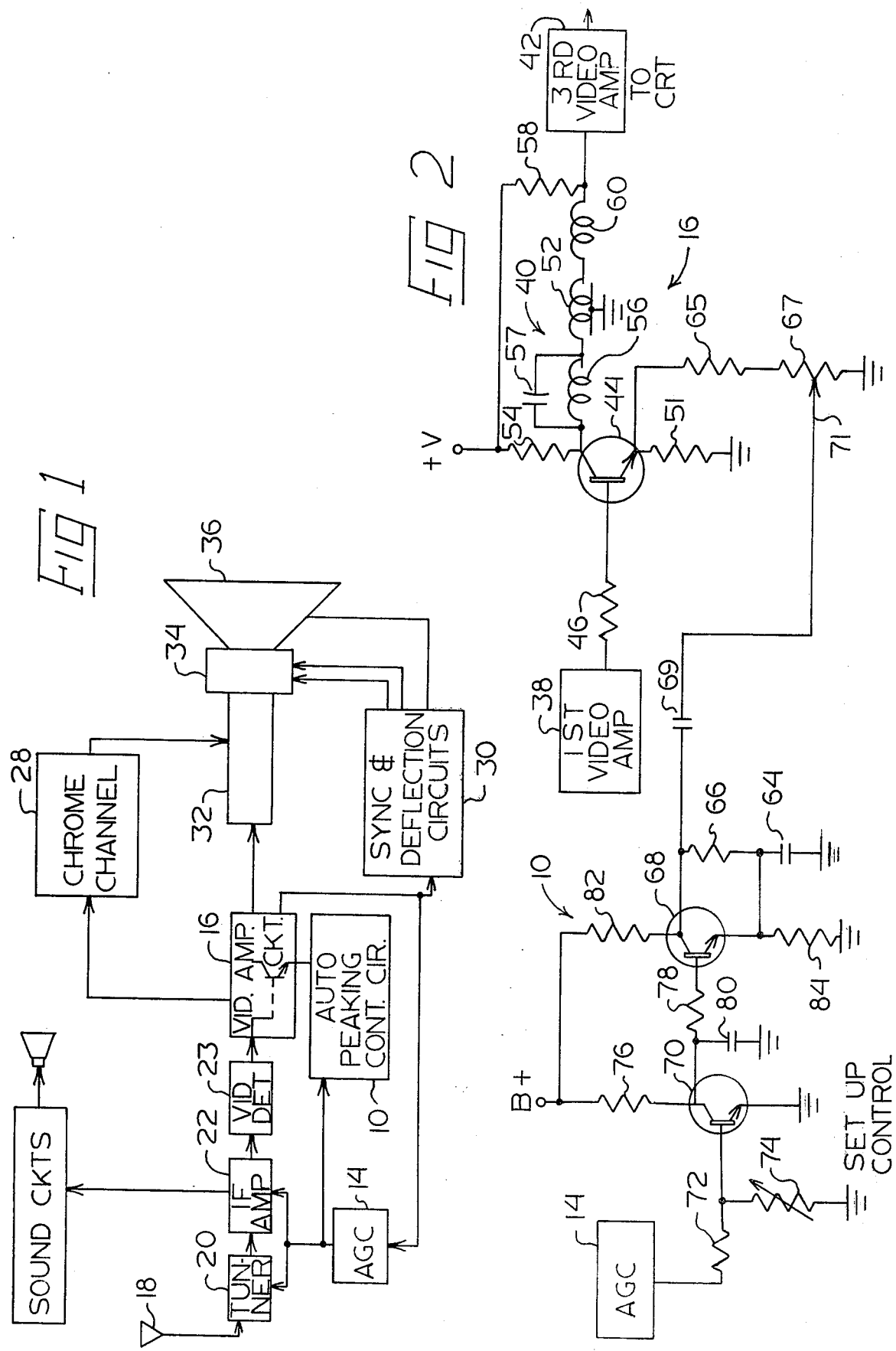

AUTOMATIC PEAKING CONTROL CIRCUIT FOR LOW LEVEL T.V. SIGNAL RECEPTION

BACKGROUND OF THE INVENTION

This invention relates to a peaking control circuit which functions automatically to reduce the high frequency response of a video amplifier when weak television signals are being received.

The high frequency components of a composite television video signal correspond to the smallest picture elements in a horizontal line. If the high frequency components are not adequately amplified, the rapid changes between dark and light colors for small adjacent picture elements in a horizontal line cannot be reproduced on the television screen. This produces a picture with reduced horizontal detail, commonly referred to as a "soft" picture. Adequate amplification of the high frequency components, on the other hand, produces a picture with greater horizontal detail, commonly referred to as a "crisp" picture.

When the high frequency response of the video amplifier produces a crisp picture, any high frequency noise in the received signal is emphasized together with the information-carrying high frequency components. When a strong signal is being received, the high frequency amplification necessary for producing a crisp picture is low enough so that any high frequency noise will not have an adverse effect on the picture. However, when the received signal is weak, such that a substantial portion of its high frequency content is noise, the video amplification necessary to produce a crisp picture may be great enough so that the amplified high frequency noise produces a substantial deterioration in picture quality. Thus, it is not always desirable to provide the video amplifier with the high frequency response needed for a crisp picture.

Because of this noise problem, some video amplifiers have included means for manually altering their high frequency responses. Such peaking control circuits enable an operator to manually adjust for a very crisp or a very soft picture in accordance with high frequency signal-to-noise conditions or viewer preference. One known peaking control circuit utilizes a variable resistor in series with a capacitor in the emitter circuit of a video amplifier transistor. When the resistor is adjusted to its minimum resistance value, minimum degeneration and thus maximum peak frequency response is obtained. Another manual peaking control circuit of this type is shown in U.S. Pat. No. 2,627,022, in which manual reduction of peaking also results in reduction of the AGC threshold level.

Peaking control circuits which require manual operation are not satisfactory. User satisfaction depends upon the operator of the receiver having some appreciation of the intended functions of the controls and their effect on the television picture. A more important factor contributing to user dissatisfaction is the necessity of manually adjusting the peaking control each time there is a change in received signal strength, which may occur each time the receiver is tuned to a different channel.

SUMMARY OF THE INVENTION

The above disadvantages of manual peaking control circuits are substantially eliminated by a novel automatic peaking control circuit which controls the high frequency response of the video amplifier in accordance with received television signal strength. The automatic peaking control circuit is responsive to a control signal representative of the average, as opposed to instantaneous, strength of the received television signal to raise and lower the peak frequency response in accordance with increased and decreased received signal strength. The automatic peaking control circuit can be used with existing automatic gain control circuits already present in most television receivers, so that a separate source of control signal need not be provided to monitor the strength of the received television signal.

The frequency response of the video amplifier is changed by the automatic peaking control circuit. When the average strength of the received television signal, as represented by the control signal, is above a selected level, the automatic peaking control circuit switches the peak frequency response to a selected increased level at which the high frequency information-carrying components are adequately amplified to produce a crisp picture. When the average received signal strength decreases below this selected level, a reduced peak frequency response is established which substantially prevents amplification of the high frequency noise content of the received signal.

The levels of received signal strength at which the peak frequency response of the video amplifier is increased and decreased may be manually varied. This allows the automatic peaking control circuit to be adjusted to decrease the peak frequency response in areas of greater high frequency noise. The first and second peak frequency response established by the automatic peaking control circuit can also be manually adjusted so that these levels may be selected in accordance with viewer preference.

The advantages of these features of the automatic peaking control circuit will be made more apparent, and further features and advantages will be discussed, in the following description of the preferred embodiment taken in conjunction with the drawings.

BRIEF DESCRIPTION OF THE DRAWINGS

FIG. 1 is a block diagram of a television receiver incorporating the novel automatic peaking control circuit; and FIG. 2 is a schematic diagram of the automatic peaking control circuit of FIG. 1 as incorporated in the second stage of the video amplifier.

DESCRIPTION OF THE PREFERRED EMBODIMENT

Referring to FIG. 1, the automatic video peaking control circuit 10, as employed in a typical television receiver, is connected between an automatic gain control (AGC) circuit 14 and a video amplifier 16. Composite television signals including a video component and a sync component are received on antenna 18 and coupled to a tuner 20, an IF amplifier stage 22, and a video detector 23, before being coupled to the video amplifier 16. In the case of a color television receiver, a chroma channel 28 is coupled between the video amplifier and a tri-color cathode-ray tube 32.

Video amplifier 16 increases the amplitude of the demodulated video signal from the video detector 23 to the requisite level needed by the picture tube. Preferably, the video peaking control circuit 10 controls the frequency response of one stage of the video amplifier 16. The AGC circuit 14 minimizes the effect of changes in received signal strength by regulating the gain of the RF and IF stages so that a strong signal is amplified less than a weak signal. The AGC circuit 14 corrects for variations between signals received at different channels, and variations occurring from time to time on the same channel, due to such factors as varying atmospheric conditions.

Various methods of automatic gain control are known, such as rectified AGC, amplified AGC, keyed AGC, and delayed AGC, and the present invention is applicable to all such methods. The average value of the video voltage is not a true indication of signal strength, for video signal amplitude increases during the transmission of scenes of high brightness. Thus, it is usually the sync pulse signal, which has a constant amplitude regardless of picture content, that is monitored by the AGC circuit to provide the received signal strength indication. The automatic peaking control circuit 10 can be used with any AGC circuit 14 which generates a DC voltage that varies with signal strength.

Referring to FIG. 2, a preferred embodiment of the automatic peaking control circuit is illustrated which controls the maximum peak frequency response of a second video amplifier 40 of a three-stage video amplifier circuit 16. A first video amplifier stage 38 produces a positive-going composite video signal which is direct-coupled to the base of a NPN amplifier transistor 44 through a resistor 46. Transistor 44 is biased as a class A amplifier by the DC coupling from the first video amplifier stage 38. The emitter of transistor 44 is connected to ground reference through a resistor 51. The amplified video output from the collector of transistor 44 is delayed by a video delay line 52 to obtain proper synchronization with the signals processed by the chroma channel 28 before being fed to the third video amplifier 42. The input impedance to delay line 52 is matched to the output impedance of the second stage amplifier 40 by means of a load resistor 54. A parallel connected inductor 56 and a capacitor 57 form a 3.58 MHZ trap. The output impedance of delay line 52 is matched to the input impedance of the third video amplifier stage 42 by means of a resistor 58 and inductor 60. The output of the third video amplifier 42 is DC coupled to the cathode-ray tube 32.

The automatic peaking control circuit 10 controls the high frequency response of second video amplifier stage 40 by controlling the resistance value of a circuit connected between the emitter of transistor 44 and ground through a peaking capacitor 64. This emitter circuit comprises a fixed resistor 65 connected to the emitter of transistor 44, a potentiometer resistor 67 connected to fixed resistor 65, a coupling capacitor 69 connected to potentiometer resistor 67 through a wiper contact 71, a peaking control resistor 66 connected to coupling capacitor 69, and a peaking capacitor 64 connected between peaking control resistor 66 and ground. When the resistance characteristic of the emitter to collector circuit is increased, the frequency response of second video amplifier 40 is decreased. When the characteristic resistance of this circuit is decreased, the peak frequency response of second video amplifier 40 is increased. The value of the resistance characteristic of the emitter to collector circuit establishes the peak frequency response of second video amplifier 40, because the amount of amplification of high frequency signals applied to transistor 44 depends directly upon the magnitude of the high frequency signal component conducted by peaking capacitor 64, which is inversely related to the resistance connected therewith.

The characteristic resistance of the emitter to collector circuit of transistor 44 is controlled electrically in accordance with the average strength of the received television signal as indicated by the output of AGC circuit 14. A transistor switch 68 has its collector connected to one side of resistor 66 and its emitter connected to the other side of resistor 66 so as to shunt resistor 66. When transistor 68 is turned on, the peaking control resistor 66 is shorted out by the emitter to collector circuit and the total resistance is thereby decreased. This establishes a relatively high peak frequency response for second video amplifier 40. When transistor 68 is turned off, the resistance of the emitter to collector circuit of transistor 44 is greatly increased and the resistance of peaking control resistor 66 becomes the controlling factor. This establishes a relatively low peaking frequency response for second video amplifier 40.

The actual levels of the relatively high or first peak frequency response, and the relatively low or second peak frequency response of video amplifier 40, as established by peaking control resistor 66 and transistor 68, are manually selected by means of potentiometer resistor 67. By adjusting the wiper contact 71 to reduce the portion of potentiometer resistor 67 between wiper contact 71 and fixed resistor 65, the first and the second peak frequency response points may be increased, and by increasing that portion of potentiometer resistor 67, the first and the second peak frequency response points may be lowered. This cooperation of potentiometer resistor 67 with peaking control resistor 66 provides the advantages of both manual and automatic peaking control.

Returning to the automatic feature of the peaking control circuit, switching transistor 68 is controlled by another switching transistor 70 which is controlled in accordance with the magnitude of the output signal from AGC circuit 14. The base of transistor 70 is connected to the output of AGC circuit 14 through a current limiting resistor 72. The base is also connected to ground reference potential through a variable base bias resistor 74 which forms a variable voltage divider with resistor 72. A voltage is produced at the junction between resistors 72 and 74 and applied to the base of resistor 70 that is proportional to the output signal from AGC circuit 14. The collector of transistor 70 is connected to a positive DC power supply B+ through a load resistor 76. The emitter of transistor 70 is connected to ground. The output signal from the collector of transistor 70 is connected to the base of transistor 68 through a resistor 78. The collector of transistor 70 is also connected to ground through a capacitor 80 which forms an RC time delay circuit with load resistor 76. The collector of transistor 68 is connected to potential source B+ through a load resistor 82, and its emitter is connected to ground through an emitter bias resistor 84.

Transistor 70 turns on when the signal at its base from the voltage divider resistors 72 and 74 exceeds a characteristic switching level of the transistor. When transistor 70 turns on, it grounds the base of transistor 68 through resistor 78. This causes transistor 68 to turn off. Conversely, transistor 70 turns off when the signal at its base decreases to another characteristic switching level.

When transistor 70 turns off, capacitor 80 charges through resistor 76, and after a preselected time period, base drive is applied to transistor 68 which turns on in response thereto. The preselected time period is established by the RC time constant of resistor 76 and capacitor 80. If transistor 70 should turn on again before the RC time period has elapsed, transistor 68 is inhibited from responding to the turn-off of transistor 70, and transistor 68 remains off. This RC time delay is provided so that noise spikes or minor fluctuations of the switching level at the base of transistor 70 will not result in undesirable switching of transistor 68.

The average strength of the received signal at which switching occurs may be manually selected by varying the resistance of variable resistor 74. The signal at the junction between resistors 72 and 74 applied to the base of transistor 70 is proportional to the output signal of AGC circuit 14. By increasing the resistance value of resistor 74, the magnitude of the AGC signal when the base signal reaches the switching level of transistor 70 may be decreased. By decreasing the resistance value of variable resistor 74, the magnitude of the AGC signal that is required when the base voltage reaches the switching level of transistor 70 may be increased. The received signal strength at which peaking is defeated or enabled is desirably selected in accordance with the average strength of high frequency noise in the reception area. Variable resistor 74 is accessible at an operator control panel for adjustment so that the peak frequency response of the video amplifier is defeated at a higher signal strength level in a reception area of greater high frequency noise than in a reception area of lesser high frequency noise. This adjustment is made when the television receiver is first installed in a particular area, and usually is not changed unless changes occur in the amount of high frequency noise in the area.

Having described the invention, the embodiments of the invention in which an exclusive property or privilege is claimed are defined as follows:

1. In a television receiver having a video amplifier for amplifying the video component of a received composite television signal and a control circuit responsive to the composite signal for generating a control signal representative of the average strength thereof, an automatic peaking control circuit, comprising:
   a peaking circuit connected with said video amplifier for establishing the peak frequency response of the video amplifier; and
   control means connected to the peaking circuit and responsive to the control signal for automatically controlling the peak frequency response in accordance with variations in the average signal strength.

2. The automatic peaking control circuit of claim 1 in which said control means includes means switchable between first and second states in response to the control signal assuming first and second representative levels, respectively, and connected with a control element in said peaking circuit to increase the peak frequency response of the video amplifier when the switchable means is in said first state.

3. The automatic peaking control circuit of claim 2 in which the control element comprises a resistor.

4. The automatic peaking control circuit of claim 2 in which said control means includes timing means for providing a time delay period to delay the response of the switchable means in response to said control signal assuming one of said first and second representative levels, and for preventing said switchable means from responding to said control signal at the end of the time delay period when the control signal assumes, the other one of said first and second representative levels during said time delay period.

5. The automatic peaking control circuit of claim 2 wherein said control element is connected in parallel with said switchable means to switch said peak frequency response between a first peak frequency response and a second peak frequency response when the control signal assumes first and second values respectively representative of preselected high and low levels of signal strength.

6. The automatic peaking control circuit of claim 5 including control means connected with the peaking circuit for manually altering the peak frequency response of the video amplifier.

7. The automatic peaking control circuit means of claim 5 wherein the switchable means comprises a transistor with its emitter collector path connected in parallel with the control element.

8. In a television receiver,
   means for receiving a radio frequency signal,
   means for deriving a video signal from said radio frequency signal,
   means for amplifying said video signal,
   means for detecting the radio signal strength,
   preference circuit means connected to said amplifying means for improving the high frequency response of said amplifying means, and
   defeat circuit means connected to said preference circuit means for disabling said preference circuit means in response to a predetermined detected low level of signal strength of the radio frequency signal.

9. In a television receiver having a video amplifier for amplifying the video component of a received composite television signal and an automatic gain control circuit for generating a control signal representative of the average strength of the video signal, an automatic peaking control circuit comprising;
   a filter circuit comprising a series resistor capacitor combination connected with the video amplifier to alter the frequency response thereof,
   a transistor with its emitter collector path connected in shunt relationship with the resistor,
   said gain control circuit connected to the base of the transistor so that the transistor effectively shunts the resistor when said control signal exceeds a predetermined level, whereby the amplification of the high frequency components by the amplifier is greater during strong signal reception than during weak signal reception.

* * * * *